United States Patent [19]

Wygnanski et al.

[11] 4,257,224
[45] Mar. 24, 1981

[54] METHOD AND APPARATUS FOR CONTROLLING THE MIXING OF TWO FLUIDS

[75] Inventors: Israel Wygnanski, Herzlia, Israel; Heinrich Fiedler, Berlin, Fed. Rep. of Germany

[73] Assignee: Remot University Authority for Applied Research & Industrial Develop. Ltd., Ramat Aviv, Israel

[21] Appl. No.: 927,685

[22] Filed: Jul. 25, 1978

[30] Foreign Application Priority Data

Jul. 28, 1977 [IL] Israel .................................. 52613

[51] Int. Cl.³ .......................... F02K 1/26; B01F 11/00
[52] U.S. Cl. ........................................ 60/204; 60/749; 181/220; 366/108; 366/119; 417/198
[58] Field of Search ................ 60/261, 262, 263, 264, 60/269, 39.72 P, 39.72 R; 417/151, 198; 48/180 C; 181/220; 239/127.3, 265.17, 265.19, 4, 102; 366/106, 108, 118, 119, 276, 336; 222/142, 195, 200; 261/1, 81, DIG. 48; 422/127, 128, 225; 123/119 EE; 137/604

[56] References Cited

U.S. PATENT DOCUMENTS

| | | | |
|---|---|---|---|
| 2,414,494 | 1/1947 | Vang | 261/1 |
| 3,049,876 | 8/1962 | Connors | 60/264 |
| 3,362,431 | 1/1968 | Chaulin | 60/262 |
| 3,420,060 | 1/1969 | Ostroff | 60/264 |
| 4,030,289 | 6/1977 | Kampe | 60/269 |
| 4,063,826 | 12/1977 | Riepe | 417/436 |

FOREIGN PATENT DOCUMENTS 600768  12/1959  Italy .................................. 417/436

Primary Examiner—Robert E. Garrett
Attorney, Agent, or Firm—Benjamin J. Barish

[57] ABSTRACT

A method and apparatus are described for controlling the mixing of two fluids in which an active element is driven to induce, in the vicinity of the beginning of the mixing region, oscillations of the two fluids about an axis substantially normal to the mixing region flow axis.

The active element may be driven by an external drive, or by the kinetic energy in the fluids. Several applications of the invention are described including promoting combustion in jet engines, suppressing audible jet noise, and increasing the output of ejector pumps or thrust augmentors.

21 Claims, 20 Drawing Figures

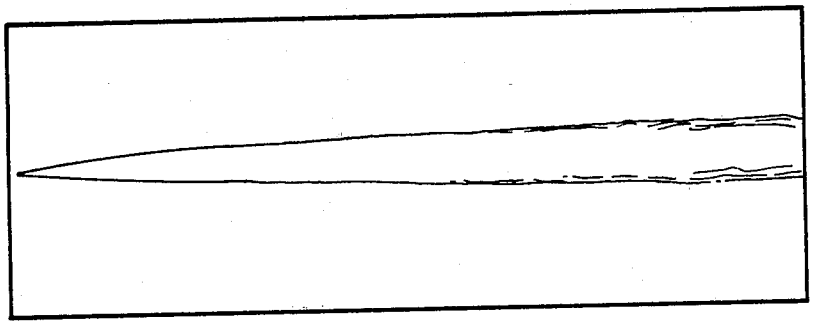
Fig. 3a (A=0)
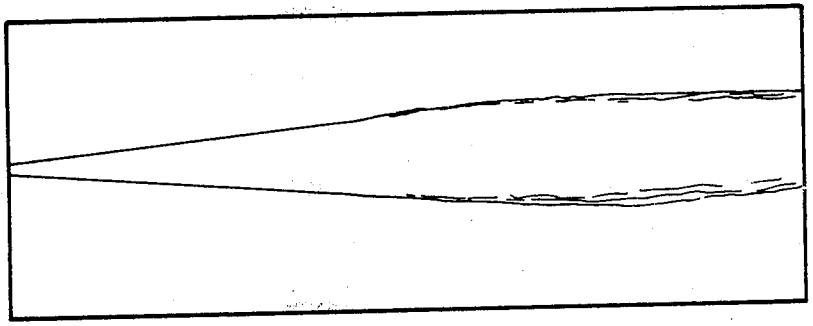
Fig. 3b (A=3mm)
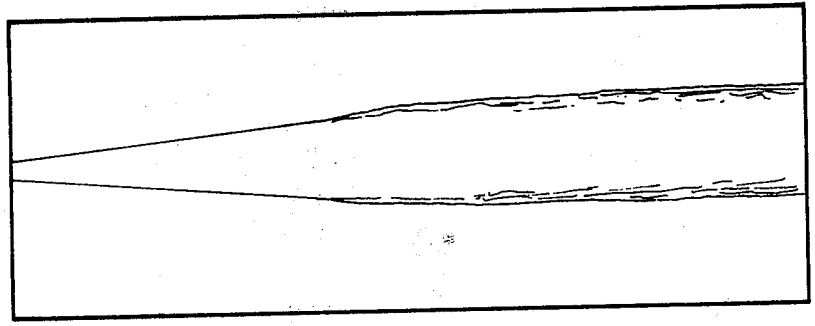
Fig. 3c (A=4mm)

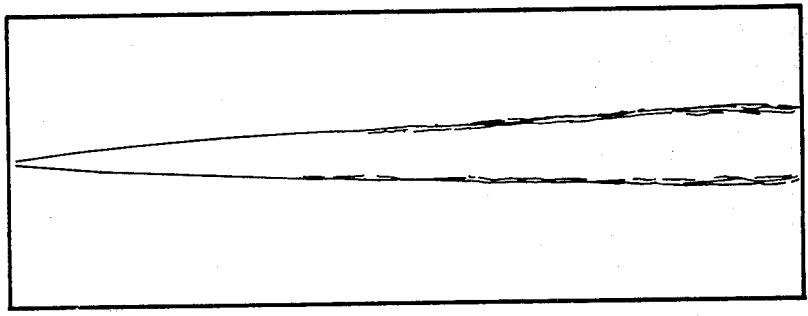
Fig. 4a  (f=0)
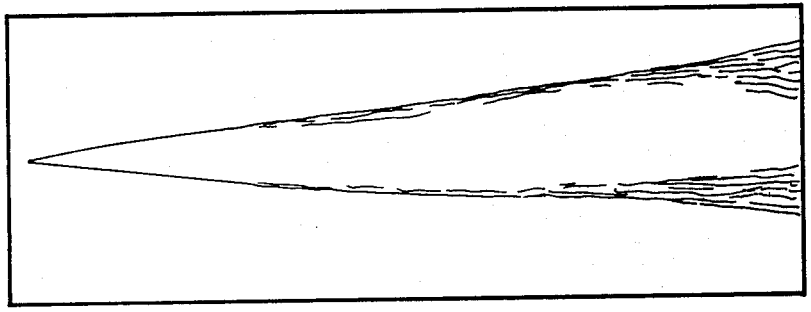
Fig. 4b  (f=20Hz)
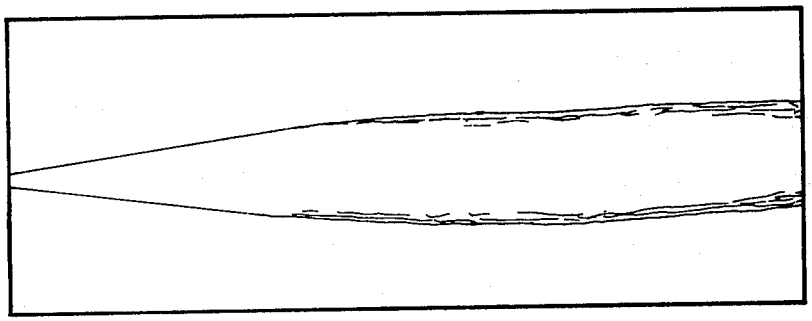
Fig. 4c  (f=40Hz)

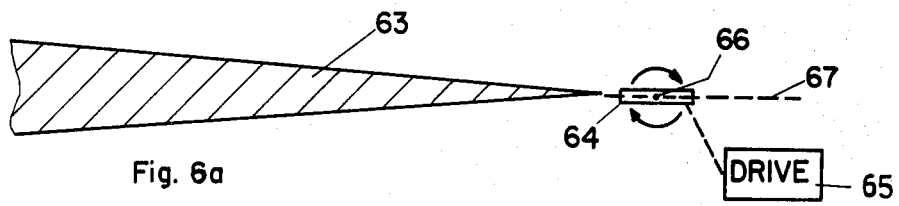
Fig. 6a
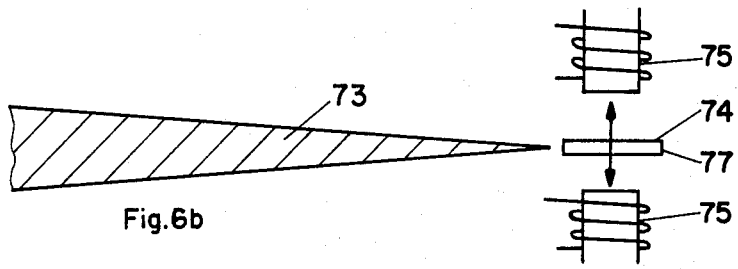
Fig.6b
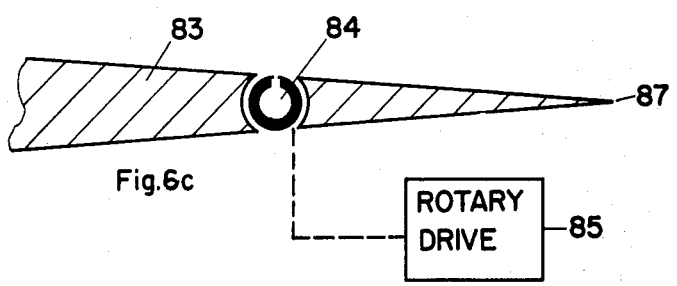
Fig.6c
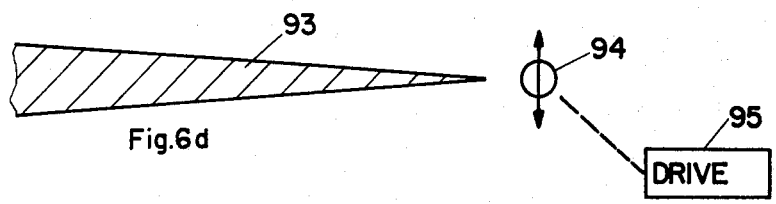
Fig.6d
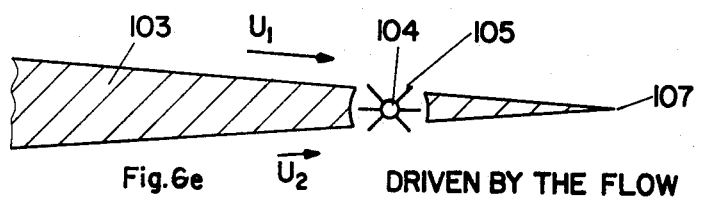
Fig.6e  DRIVEN BY THE FLOW
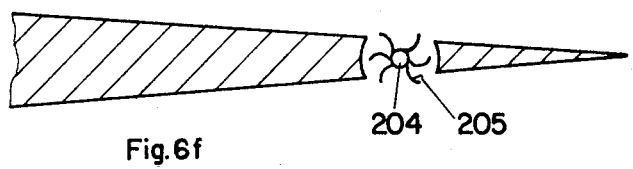
Fig.6f

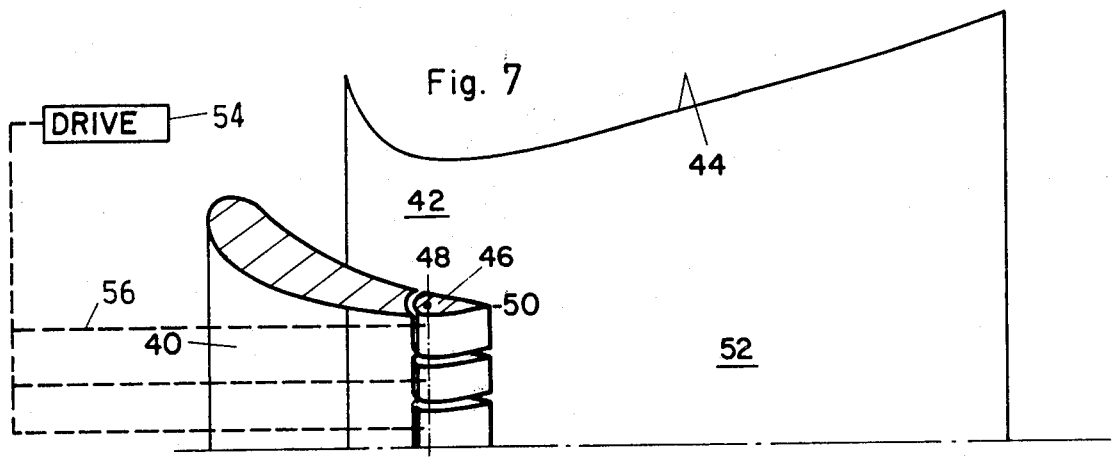
Fig. 7
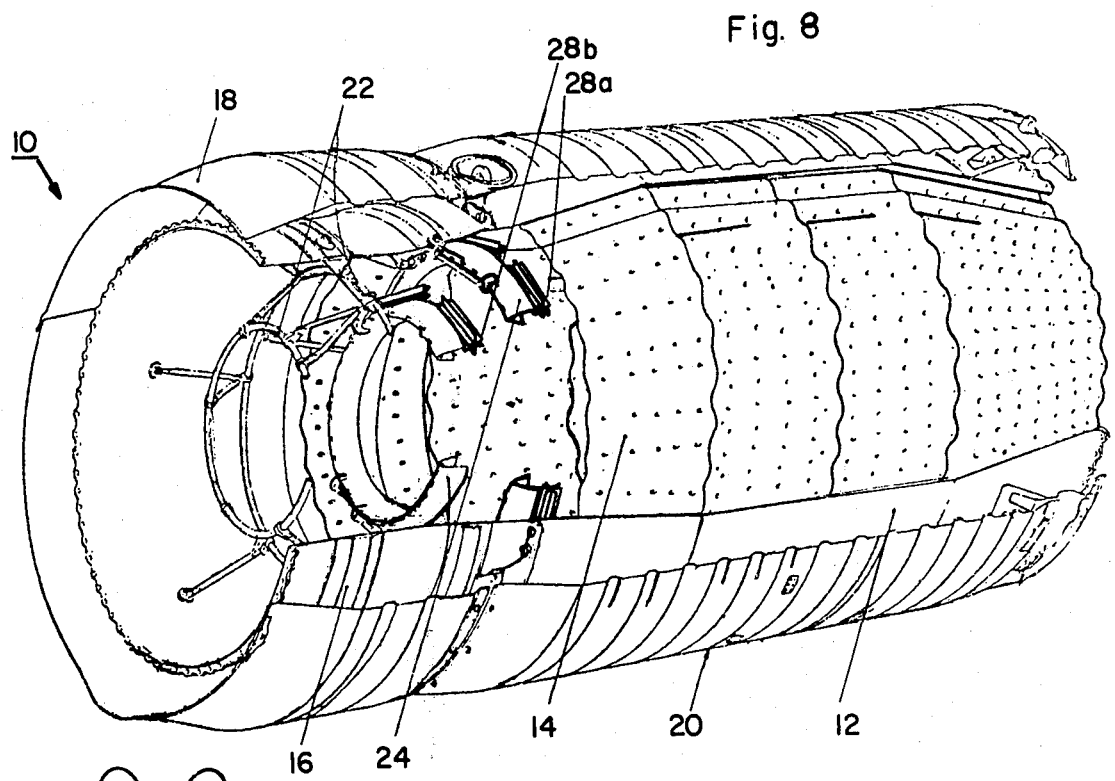
Fig. 8
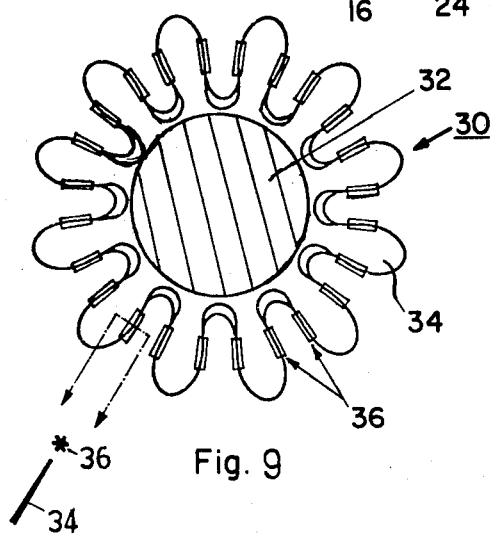
Fig. 9
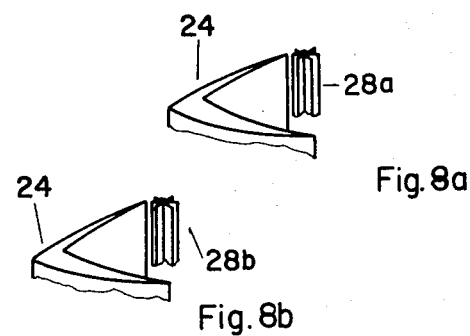
Fig. 8a
Fig. 8b

METHOD AND APPARATUS FOR CONTROLLING THE MIXING OF TWO FLUIDS

BACKGROUND OF THE INVENTION

The present invention relates to a method and apparatus for controlling the mixing of two fluids of the same state (e.g. two gases, or two liquids) or of substantially the same state (e.g. a gas and fine liquid droplets). The invention is particularly useful in applications wherein it is desirable to enhance or otherwise control the mixing of the two fluids for promoting combustion or other chemical reactions, suppressing audible jet noise, or increasing the output of ejector pumps. The invention is therefore described below particularly with respect to such applications, but it will be appreciated that the invention could also be advantageously used in many other applications involving the control of mixing of two fluids.

The design criteria in many mixing processes are presently established on the basis of available data in a turbulent mixing layer. It is generally believed that the mixing process cannot be affected appreciably without a significant loss of energy. In particular, it is not considered possible to control the rate of mixing by altering only slightly the initial condition of the flow at its origin. Statements implying that the turbulent shear layers quickly become self-similar, thus losing the effect of their initial conditions, are still quite often made in the professional literature.

The foregoing concept directly affects the determination of the length of a combustion chamber or other mixing chamber, the determination then depending on the quantity of fluids which are to be mixed, their rate of reaction, the pressure gradients, and the velocities of the individual streams. A large body of experimental data provides empirical or semiempirical relations which are used in the design of combustors, flame holders, afterburners in turbo-jet engines, ram jet engines, gas-dynamic lasers, and even air curtains. In many cases, the combustors or mixing chambers could be made of shorter length if the mixing process could be enhanced, thereby conserving costly materials and weight in the manufacture of the engines, augmentors, and the like. Control or partial control (not necessarily enhancing) of the mixing process could produce advantages in many other applications, e.g., suppressing audible jet noise, inhibiting mixing in air curtains, and the like.

SUMMARY OF THE INVENTION

According to a broad aspect of the present invention, there is provided a method of controlling the mixing of two fluids of the same state or of substantially the same state in a mixing region having a flow axis, in which method at least one of the fluids in directed to flow into direct contact with the other fluid at the beginning of the mixing region; characterized in that an active element is driven to induce, in the vicinity of the beginning of the mixing region, oscillations of the two fluids about an axis substantially normal to said mixing region flow axis so as to produce, at the boundaries of said mixing region, small flow fluctuations substantially perpendicular to the flow axis.

The active element may move up and down in translation, or may change its angle of attack (i.e., the inclination angle between the fluid stream and the chord of the element). In any case, the active element induces, at the boundaries of the mixing region small fluctuations in the flow which are generally normal to the flow axis, or direction of streaming, through the mixing region. It is these normal (perpendicular) fluctuations, or small velocity perturbations, which contribute to the inherent instability of the flow and enhance (or otherwise control) the mixing.

In most of the preferred embodiments of the invention described below, the active element is driven by an external drive.

One form of active element which has been found particularly useful for inducing the oscillations is a pivotable flap which is driven by an external drive about a pivot axis substantially at the beginning of the mixing region, i.e. the point at which the two fluids first meet. The drive for oscillating the active element, e.g. the pivotable flat, may be externally driven by mechanical, electrical or hydraulic devices. It has been found, as will be shown below, that both the frequency and amplitude of oscillation influence the mixing of the two fluids in the mixing region.

The introduction of small velocity perturbations or oscillations in the flow substantially normal to the direction of streaming, may be implemented by other active elements, for example by a rotated flap, a reciprocating ribbon, or a rotating nozzle which injects small quantities of a fluid normal to the direction of streaming. The oscillations could also be induced by disposing a small cylindrical wire slightly downstream of the beginning of the mixing region substantially aligned with the flow axis, and reciprocating the wire normal to the flow axis to induce the oscillations both by vortex shedding and by reciprocation of the wire. The higher harmonics or sub-harmonics of the oscillations control (e.g. enhance or inhibit) the mixing process, depending on their frequency.

It should be noted that when an active element is used to induce the oscillations in accordance with the invention, the total energy required is very small, and should not be confused with known procedures of oscillating one of the streams by pulsating the entire stream, which involve a much larger order of magnitude of energy.

The present invention also provides apparatus for controlling the mixing of two fluids in accordance with the above-described method.

Several applications of the novel method and apparatus are described below. One application is in promoting combustion in a fuel injector type combustion apparatus in order to decrease the length of the combustion chamber; one described embodiment of such an application is in the after-burner section of a jet engine to decrease the length of the combustor or tail-pipe. A second described application relates to the control of mixing of the exhaust gases from a jet engine in order to suppress audible jet noise. A third described application relates to ejector pumps to thrust augmentors for increasing the entrainment of the fluid to be pumped in the primary jet of the ejector pump or thrust augmentor.

Further features and applications of the invention will be apparent from the description below.

BRIEF DESCRIPTION OF THE DRAWINGS

The invention is herein described, somewhat diagrammatically and by way of example only, with reference to the accompanying drawings, wherein:

FIGS. 2, 3 and 4 illustrate results from actual tests using the pivotable flap of FIG. 1;

FIGS. 6a-6f illustrate other forms of oscillation-inducing elements which may be used in accordance with the invention;

FIG. 7 illustrates an ejector pump or thrust augmentor equipped with oscillation-inducing elements in accordance with the present invention to increase the output of the pump;

FIG. 8, and its enlarged fragmentary views of FIGS. 8a and 8b, illustrate the tail-pipe in the after-burner section of an Atar engine, in which the gutter-type flame holder has been equipped with oscillation-inducing elements in accordance with the present invention to shorten the over-all length of the tail-pipe; and FIG. 9 illustrates the exhaust pipe of a jet engine equipped with oscillation-inducing elements in accordance with the invention to suppress audible jet noise.

DESCRIPTION OF PREFERRED EMBODIMENTS

Figure 1:
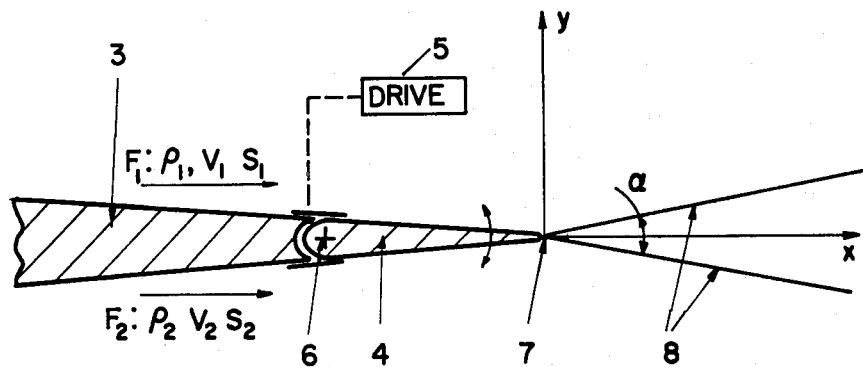
FIG. 1 is a schematic diagram illustrating one preferred embodiment of the invention, namely the enhancement of the mixing process by driving a pivotable flap.

With reference first to FIG. 1, which is a schematic diagram of the mixing process with an oscillating flap as an active element, there is shown a stream of a first fluid (fluid $F_1$) having density $\rho_1$, velocity $V_1$, specie $S_1$ (as well as temperature and other physical properties not indicated, like viscosity conductivity etc.) which is directed to mix with a stream of another fluid (flud $F_2$) having different properties correspondingly marked $\rho_2$, $V_2$, $S_2$. Initially, the two streams are separated by a splitter plate 3. A flap 4 driven by an external drive 5 is oscillated up and down around pivot axis 6. The mixing region starts at point 7, the point of initial contact of the two fluids, and proceeds with increasing distance (x) downstream. The mixing region has the shape of a wedge, its boundaries being indicated by lines 8; the larger the wedge angle $\alpha$ the better is the mixing.

FIG. 1 is a cut through a possible configuration which, in many cases in practice, would be axisymmetric; i.e. both the start (7) of the mixing region, and the oscillation-inducing element (flap 4) would be of annular or taurus shape.

The initial mixing between the two parallel streams is characterized by an array of large vortices which are generated by the shear existing between the streams. If the two streams are of fluids of different species, the layers of alternating fluids are rolled in a wafer-like pattern inside these large vortices. As the vortices flow downstream (direction x) more and more mixed fluid of the two species become contained in the folds of the above pattern allowing turbulent and molecular diffusion to act. Without external inducement, the process is not very regular although it is not random in either space or time. The external inducement of the oscillations by the flap 4 regulates the process and exercises control over it for some significant distance downstream. This distance is sufficiently large to control many processes of technological significance.

Figure 2:
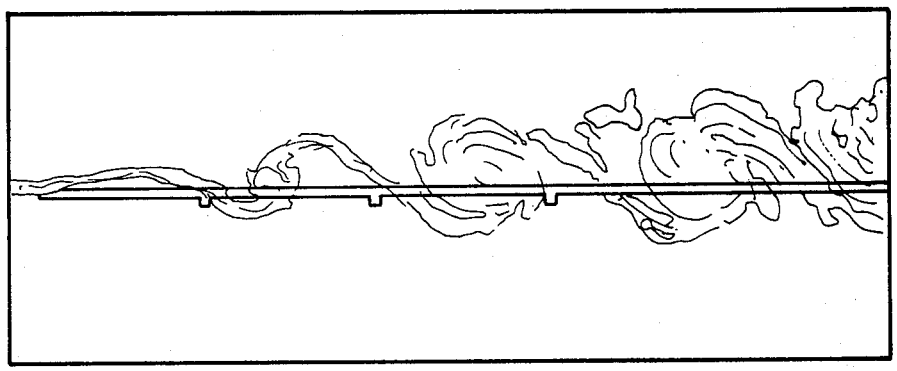

FIG. 2 shows an instantaneous picture of an array of such vortices when the flap 4 was oscillated at 40 $H_z$ at an amplitude of 10 mm; the velocity ($V_1$) of fluid 1 was 6.4 m/sec; and the velocity ($V_2$) of fluid 2 was 16 m/sec. The vortices were tagged by inserting smoke on the upper surface of flap 4. This picture shows the path one such smoke filament takes as it is swept downstream; there is more fluid entrained in the mixing layer, but it is not seen in the picture. The velocity ratio between the two streams in FIG. 2 is 0.4, with the upper stream being the slower one. The Reynolds number is approximately one million ($Re = (Ux/v)$, where "U" is the characteristic velocity, "$v$" is the kinematic viscosity, and "x" is the downstream distance). This Reynolds number (Re) is large enough to apply to many technologically important configurations. The distance covered by the picture of FIG. 2, from the beginning of mixing is 1.5 meters.

FIGS. 3a-3c illustrate long time exposure pictures of smoke diffusion in the mixing region at different amplitudes (A) of oscillations of flap 4, but otherwise under the same conditions. The uppermost picture (FIG. 3a) shows a conventional mixing layer of two streams with the flap inactive (i.e., A, the amplitude of oscillation, = 0). The other two pictures (FIGS. 3b, 3c) were taken with the flap oscillating at increasing amplitude (A=3 mm in FIG. 3b, and 4 mm in FIG. 3c). All other parameters of the flow were kept unchanged. It will be seen that the smoke diffused almost twice as fast in FIGS. 3b and 3c wherein the flap was active, in comparison with FIG. 3a wherein the flap was inactive.

FIGS. 4a-4c illustrate a sequence of three pictures showing the diffusion of a smoke filament in a mixing layer at different frequencies. In this sequence, the uppermost picture (FIG. 4a) shows the conventional mixing layer, i.e. when the flap is inactive (f=0). The center picture (FIG. 4b) illustrates the mixing layer when an active element (i.e. flap 4) oscillates at f=20 Hz, and the bottom picture (FIG. 4c) illustrates the condition when the oscillations were at f=40 Hz. The purpose of these pictures is to show the effect of frequency on the diffusion rate. At f=40 Hz the smoke spread quickly initially, but the rate of spread slowed down approximately 50 cm. from the edge of the splitter-plate; at f=20 Hz (FIG. 4b), the rate of spread increased all the way down to the end of the test section (150 cm).

Thus, the frequency of the flap oscillation plays an important role over the range in which the mixing layer can be controlled. The frequencies mentioned above apply directly for the specific case tested. For other velocities and configurations, the preferred frequency and amplitude would have to be tested to produce the desired control of the mixing process.

When the mixing occurs between two streams of different velocities, the width of the mixing layer is usually determined by the deviation of the local velocity from the velocity of the main stream. If the stream of fluid $F_1$ has a lower velocity than the stream of fluid $F_2$, the ratio $(U-U_1)/(U_2-U_1)$ will always be smaller than unity within the mixing region. Thus, we can arbitrarily define the boundaries of the mixing region by considering one boundary at $(U-U_1)/(U_2-U_1)=0.1$, and the other at $(U-U_1)/(U_2-U_1)=0.9$.

Figure 5:
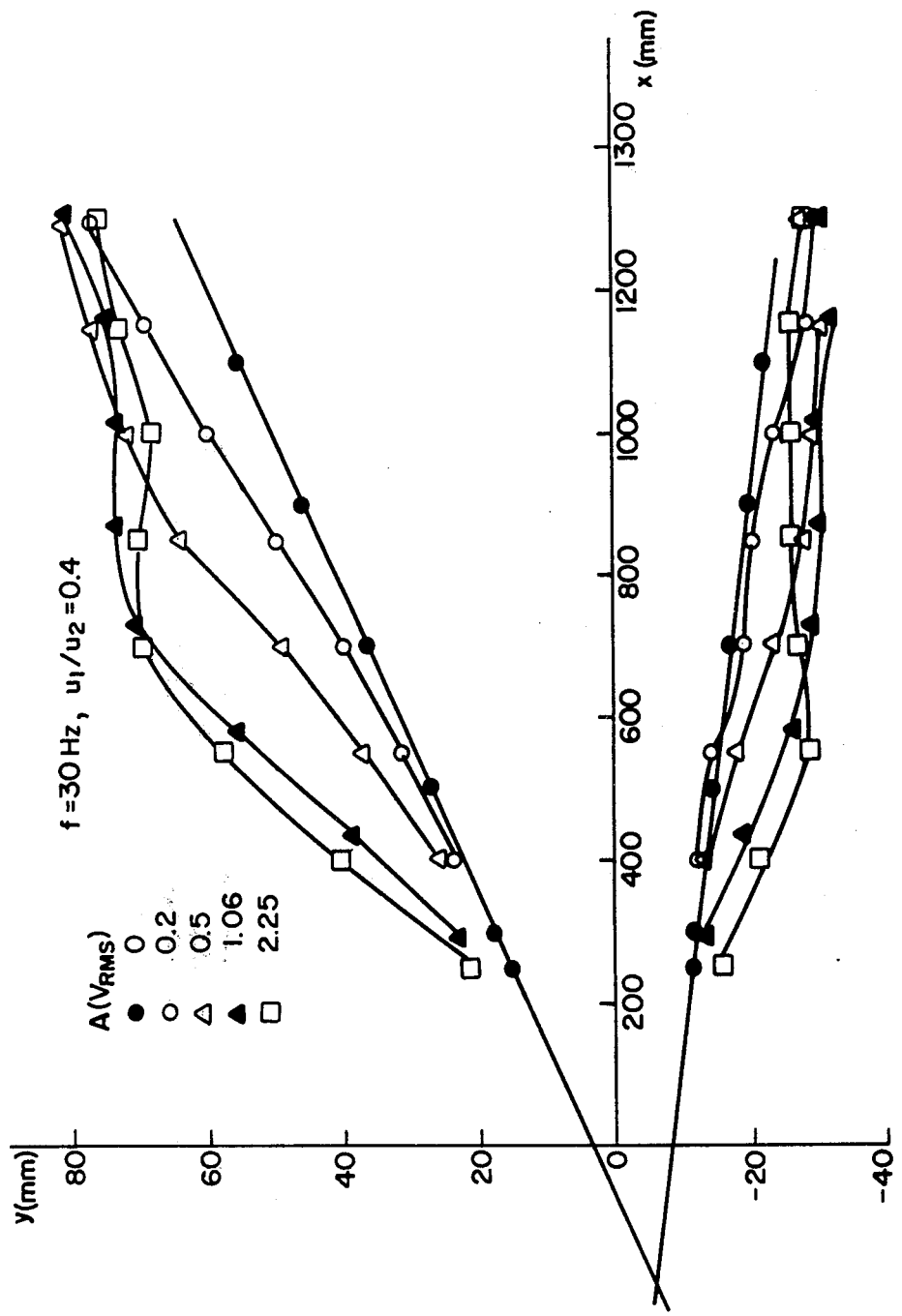
FIG. 5 is a chart setting forth quantitative data resulting from the tests illustrated by FIGS. 2-4.

FIG. 5 illustrates those boundaries (i.e., the spread "y" of the mixing layer varying with downstream distance "x") for f=30 $H_z$ and $(U_1/U_2)=0.4$ for different amplitudes of oscillation of the flap 4, the amplitudes of oscillation (A) being expressed in terms of $V_{RMS}$ applied to the external drive 5 (FIG. 1). It will thus be seen that by tuning the active element (e.g. flap 4) properly, one can attain an enhancement of mixing which doubles the efficiency of the process.

FIGS. 6a-6f illustrate other arrangements which may be used in lieu of the pivotable flaps (4, FIG. 1) for inducing the oscillations of the fluids in the vicinity of the beginning of the mixing region.

In FIG. 6a, the active element is a flap 64 disposed at the trailing edge of the splitter plate 63 and rotated by a drive 65 about an axis 66 in alignment with but normal to the mixing region flow axis 67, to induce the oscillations normal to the flow axis.

FIG. 6b illustrates another active element in the form of a ribbon 74, disposed at the trailing edge of the splitter plate 73, which is at the beginning of the mixing region of the two fluids flowing on opposite faces of the splitter plate. Ribbon 74 is reciprocated by an external drive normal to the axis of the mixing region. For purposes of example, the external drive is shown as being in the form of electromagnetic coils 75 disposed on opposite sides of ribbon 74. Other forms of reciprocating drive, for example mechanical or hydraulic, could be used, and it is even contemplated that ribbon 74 could be designed to vibrate at the desired frequency of induced oscillations, the ribbon being driven by a device which periodically applied impacts to maintain it oscillating.

FIG. 6c illustrates another form of active element which may be used for inducing the oscillations. In the embodiment of FIG. 6c, the oscillations are induced by periodically injecting a fluid jet, via a rotating nozzle 84, into the two fluid streams flowing at opposite sides of the splitter plate 83. The nozzle is rotated by an external rotaty drive 85 at the appropriate velocity to induce the oscillations at the desired frequency. It will be seen that in FIG. 6c the oscillations are induced in the mixing stream slightly upstream of the beginning of the mixing region, namely the tip 87 of the splitter plate 84, in order to accommodate the rotating nozzle 84 flush with the opposite faces of the splitter plate.

FIG. 6d illustrates still another form of active element, namely a wire 94 of cylindrical section disposed slightly downstream of the beginning of the mixing region, i.e., the trailing tip of the splitter plate 93, in alignment with the flow axis. Wire 94 is reciprocated by an external drive 95 normal to the flow axis. Such a wire, being a bluff body, induces oscillations in the flow by virtue of forced motion as well as by virtue of vortex shedding. The latter depends on the diameter of the wire, the viscosity of the fluid, and the velocity of the flow, and exists even when the wire is stationary.

The oscillations of the appropriate amplitude and frequency of the two fluids may also be induced by the kinetic energy of the two fluids, rather than by an external drive. FIGS. 6e and 6f illustrate two arrangements that may be used for this purpose. In FIG. 6e, the active element is in the form of a rotor 104 rotatably mounted about an axis perpendicular to the flow axis slightly upstream of the beginning of the mixing region, namely the tip 107 of the splitter plate 103, the rotor 104 having a plurality of blades 105 impinged by the two fluids to induce the oscillations. FIG. 6e illustrates the rotor 104 having a plurality (six) straight blades 105; FIG. 6f illustrates the rotor 204 having curved blades 205.

It will be appreciated that in most applications the beginning of the mixing region, and the oscillation inducing element, will both be of annular shape.

FIG. 7 illustrates the invention embodied in an ejector pump or thrust augmentor to enhance the entrainment of the pumped fluid in the secondary flow by the pumping fluid passing through the primary nozzle, generally designated 40. The fluid being pumped passes through the annular space 42 between the primary nozzle 40 and the outer casing 44 of the ejector pump. A plurality of externally-driven flaps 46 are provided at the trailing edge of the exhaust nozzle 40, the flaps being pivotable on a pivot axis 48 with the trailing edge 50 of the flaps at the beginning of the mixing region 52. In this case, the trailing edge of the exhaust nozzle is of annular shape, and therefore the flaps are in sections forming an annular array, each section being pivotable by an external drive 54 via linkage schematically indicated by broken lines 56. With this arrangement, a greater volume of the external fluid passing through annular space 42 may be caused to be entrained in the primary jet of fluid travelling at a high velocity through the interior of the primary nozzle 40, thereby increasing the output of the ejector pump.

Let us now consider a powerplant propulsive system in an aerospace application.

The following is quoted from an article by G. L. Dugger (in Propulsion: Theory and Design, W. H. T. Loh Editor, Springer-Verlag, 1968): "Combustion efficiency will depend on combustor length $L_c$ to some degree ... but the corresponding $n_c$ at ER=1 may only be 0.7 which might be increased to 0.85 or 0.9 by doubling $L_c$." ($n_c$ represents the efficiency of the process). Thus, by enhancing the mixing process in the combustor, one is able to attain either an appreciable shortening of the combustor or tail-pipe in which an after-burner is located, thereby producing a significant savings in material and engine weight, or an appreciable increase in the engine efficiency, if only modification of existing engines is to be effected in accordance with the invention.

FIG. 8 illustrates the invention embodied in a tail pipe of an Atar engine which is equipped with an after-burner and gutter-type flame holders. FIG. 8 illustrates only the after-burner chamber section, generally designated 10, of the tail pipe, including the pipe support 12, the thermal shield 14, the intermediate stiffener 16, the collector 18, and the external envelope 20. Further shown in FIG. 8 are the two fuel injection ramps 22, and the two annular gutter flameholders 24. The overall construction of the Atar engine is available from the published literature, and therefore further details are not deemed necessary here.

In accordance with the present invention, oscillation-inducing elements are disposed along the trailing edge of each of the two gutter flame-holders 24. Preferably, the oscillation-inducing elements in this embodiment are bladed-rotors 28a, 28b, shown more particularly in FIGS. 8a, 8b, driven by the kinetic energy in the fluids, as described above with respect to FIGS. 6e and 6f. Since the gutter-flame holders 24 are of annular shape, the rotors would also be of annular shape but divided into a plurality of sections as described above with respect to FIG. 8. By placing the rotors 28a, 28b (or other oscillation-inducing elements) on the trailing edge of each of the two annular gutter-flame holders 24, the overall length of the tail-pipe of the Atar engine can be shortened, thereby providing a substantial savings in material and weight.

It will be appreciated that the Atar engine is only one example of an aerospace power plant to which the invention could advantageously be applied.

Another application of the invention is in suppressing audible jet noise in jet engines. Many known noise suppressors use enhanced mixing for reducing jet noise and/or shifting its frequency to a less disturbing range. They do so by increasing the surface area of the mixing region in relation to the total cross-sectional area of the exhaust pipe of the jet engine.

FIG. 9 illustrates the invention applied to a jet engine exhaust pipe for purposes of suppressing audible jet noise. As shown in FIG. 9, the exhaust pipe, generally designated 30, is of daisy-shape in cross-section for increasing the surface area of the mixing region between the jet and the surrounding stream. The exhaust gases are directed through the space 34 between the inner surface of the exhaust pipe 30 and a solid conical core 32, and mix with the external air with which the exhaust gases come into direct contact at the trailing edge of the exhaust pipe. By placing the oscillation-inducing elements e.g. rotors 36, at the trailing edge of the exhaust pipe 30, the audible jet noise may be suppressed by controlling the mixing of the exhaust gases with the external air such as to decrease the level of the audible jet noise and/or to shift its frequency to a less disturbing range.

The method described above is generally useful in flows in which mixing between two fluids occur, and the control of spreading rate, turbulence intensity, frequency of the large eddies, etc., is needed. Thus, the method could be applied to many mixing processes used in the chemical and petrochemical industries, pulp and paper industries, as well as mixing processes related to combustion. Possible applications in the field of aerospace propulsion systems include enhancing of mixing in combustors and after-burners of trubo-jet and turbo-fan engines, ram jet engines, and rockets; and inhibition or other control of mixing in air-curtains and jet-noise reducers. Further examples of chemically-reacting flows in which turbulent mixing is important are given in the Table taken from Hills article in the Annual Review of Fluid Mechanics Vol. 8, 1976.

What is claimed is:

1. A method of controlling the mixing of two fluids of the same state or of substantially the same state in a mixing region having a flow axis, in which method at least one of the fluids is directed to flow into direct contact with the other fluid at the beginning of the mixing region; characterized in that an active element is driven to induce, in the vicinity of the beginning of the mixing region, oscillations of the two fluids about an axis substantially normal to said mixing region flow axis so as to produce, at the boundaries of said mixing region, small flow fluctuations substantially perpendicular to the flow axis.

2. The method according to claim 1, further characterized in that said active element is driven by an external drive.

3. The method according to claim 1, further characterized in that said active element is driven by the kinetic energy of the two fluids.

4. The method according to claim 1, further characterized in that the beginning of said mixing region, and the means for inducing oscillations therein, are both of annular configuration.

5. The method according to claim 1, applied to a jet pump to enhance the entrainment of one fluid in a secondary jet of another fluid, further charcterized in that said oscillations are induced at the trailing edge of the primary jet exhaust nozzle.

6. The method according to claim 1, applied to the combustion of fuel injected into direct contact with a fluid supporting combustion, further characterized in that said oscillations are induced at the trailing edge of the injector.

7. The method according to claim 1, applied to the suppression of audible jet noise accompanying the exhaust of gases from a jet exhaust pipe, further characterized in that said oscillations are induced at the trailing edge of the exhaust pipe.

8. Apparatus for controlling the mixing of two fluids of the same state or substantially the same state in a mixing region having a flow axis, which apparatus includes means for directing at least one of the fluids to flow into direct contact with the other fluid at the beginning of the mixing region; characterized in that the apparatus includes an active element and means for driving same to induce, in the vicinity of the beginning of the mixing region, oscillations of the two fluids about an axis substantially normal to said mixing region flow axis so as to produce at the boundaries of said mixing region, small flow fluctuations substantially perpendicular to the flow axis.

9. Apparatus according to claim 8, further characterized in that said active element is driven by an external drive.

10. Apparatus according to claim 9, further characterized in that said active element comprises a flap pivotable about a pivot axis substantially normal to both said flow and oscillation axes.

11. Apparatus according to claim 9, further characterized in that said active element is a rotatable flap rotated about an axis substantially normal to said flow and oscillation axes.

12. Apparatus according to claim 9, further characterized in that said active element comprises a ribbon reciprocatable along an axis substantially normal to said mixing region flow axis.

13. Apparatus according to claim 9, further characterized in that said active element comprises a nozzle rotated by said external drive for periodically injecting a fluid jet into at least one of the two fluids about an axis substantially normal to said mixing region flow axis.

14. Apparatus according to claim 9, further characterized in that said active element comprises a wire of cylindrical section disposed in said mixing region slightly downstream of the beginning thereof in alighment with said flow axis and reciprocated substantially normally thereto to induce said oscillations both by vortex shedding and by reciprocation of said wire.

15. Apparatus according to claim 8, further characterized in that said active element is driven by the kinetic energy of the two fluids.

16. Apparatus according to claim 15, further characterized in that said active element is a rotor rotatably mounted about an axis perpendicular to the flow axis and having a plurality of blades impinged by the fluids to induce said oscillations of the fluids.

17. Apparatus according to claim 8, further characterized in that said fluid directing means and said oscillation means are both of annular configuration.

18. Apparatus according to claim 8, further characterized in that the fluid directing means comprises a primary jet exhaust nozzle in a jet pump, the oscillation-inducing means being disposed at the trailing edge of the exhaust nozzle thereby enhancing the entrainment of the pumped fluid in the jet of the fluid directed through the exhaust nozzle.

19. Apparatus according to claim 8, further characterized in that said fluid directing means comprises a fuel injector, said oscillation-inducing means being disposed at the trailing edge of the fuel injector and thereby enhancing the combustion of the fuel injected thereby.

20. Aparatus according to claim 19, further characterized in that the fuel injector is an annular gutter-type holder in the after-burner chamber of a jet engine.

21. Apparatus according to claim 8, further characterized in that the fluid directing means comprises the exhaust pipe of a jet engine, said oscillation-inducing means being disposed at the trailing edge of the exhaust pipe thereby tending to suppress audible jet noise.

* * * * *